July 13, 1971 R. A. LOGAN ET AL 3,592,704
ELECTROLUMINESCENT DEVICE
Filed June 28, 1968

INVENTORS: R. A. LOGAN
H. G. WHITE
W. WIEGMANN
BY: David P. Kelley
ATTORNEY

United States Patent Office 3,592,704
Patented July 13, 1971

3,592,704

ELECTROLUMINESCENT DEVICE

Ralph A. Logan, Morristown, Harry G. White, Bernardsville, and William Wiegmann, Middlesex, N.J., assignors to Bell Telephone Laboratories, Incorporated, Murray Hill, N.J.

Filed June 28, 1968, Ser. No. 740,903
Int. Cl. H01l 7/38
U.S. Cl. 148—171 6 Claims

ABSTRACT OF THE DISCLOSURE

Electroluminescent p-n diodes which contain sulphur to produce an excess donor concentration of $5\times10^{16}$ to $2\times10^{17}$ cm.$^{-3}$ exhibit efficiencies of at least an order of magnitude greater than for other n-type dopants. When the diodes are produced in an ammonia atmosphere, efficiency is increased still further.

BACKGROUND OF THE INVENTION

The present invention relates to electroluminescent devices and to methods of making them. More particularly, the invention relates to such devices characterized by isoelectronic traps.

The rapid and expanding development of many fields requiring optical displays or indicators, such as, for example, the computer and communication fields, has necessitated a search for new light emitting devices which are characterized by long life, intense illumination, reliability, and simplicity. In addition, it is desirable that the devices operate at low voltages and currents.

Recently there has been a great deal of interest in a class of junction devices which exhibit what are known as "isoelectronic traps" that function as radiative centers, thereby producing luminescence upon application of a voltage to produce current flow. There has been speculation as to the exact nature of these traps which are believed to be formed by one element substituting for another of the same column of the periodic table in the crystal lattice. Although a center formed in this way exhibits no net charge, it does create a lattice defect which attracts holes and electrons. A hole and electron thus attracted to the site recombine to produce radiation. An example of an isoelectronic trap material is nitrogen-doped gallium phosphide in which the nitrogen substitutes isoelectronically for phosphorus in the crystal lattice, thereby creating traps to which both holes and electrons are attracted. Nitrogen-doped III–V compounds are disclosed in the copending United States patent application of R. T. Lynch and D. G. Thomas, Ser. No. 595,672, filed Nov. 21, 1966, now U.S. Pat. No. 3,462,320. These compounds, when doped with suitable donor and acceptor impurities, produce green luminescence at room temperature upon application of a few volts D.C. across the junction, and are characterized by long life and reliability.

SUMMARY OF THE INVENTION

In a p-n junction electroluminescent diode of the class described, the total current varies as exp $qV/nkT$ where $q$ is the charge, V is the bias, $k$ is Boltzmann's constant, T is temperature in degrees Kelvin, and $n$ is a constant approximately equal to 2. On the other hand, the light emitted varies as exp $qV/kT$.

The injection current, which is determinative of the amount of light emitted, is only a small fraction of the total current. This means that most of the current is being lost to the radiative process through nonradiative recombinations. These nonradiative recombinations take place at "killer centers" in the junction and have the effect of reducing the current available to the radiative recombination process.

The present invention is based upon the discovery that, contrary to theory and practice, increases in doping level of the donor impurity, which may, for example, be tellurium or selenium, produce a rapid decrease in light emitting efficiency. This is attributed to the fact that additional donor atoms produce additional "killer centers" at a greater rate than the rate of increase of injection current. On the other hand, we have found that the use of sulphur as the donor impurity results in a production of "killer centers," that is at least an order of magnitude less than for tellurium or selenium. It has further been found that when the doping level of sulphur is such that the number of donor atoms less the number of acceptor atoms is in the range of $5\times10^{16}$ to $2\times10^{17}$, unusually high efficiencies are obtainable. Although these efficiencies are less than for comparable red emitting diodes, the sensitivity of the human eye to green light is approximately thirty times the sensitivity to red, hence the brightness of the green diode is comparable to, and with low sulphur levels even greater than, that of red diodes.

In an illustrative embodiment of the invention, GaP junction diodes are made by epitaxially growing a layer of nitrogen-doped, zinc-doped GaP on a sulphur-doped GaP seed. The sulphur level is deliberately kept low, within the range hereinbefore specified. Upon application of a suitable bias, i.e., 2 volts, the diode emits green light from the N region with an efficiency of at least an order of magnitude higher than similar diodes utilizing either selenium or tellurium as the dopant. Diodes made in accordance with the invention exhibit increasing efficiency with increasing current up to at least an ampere of current without saturating.

The various features of the invention will be more readily understood from the following detailed description, read in conjunction with the accompanying drawings.

DETAILED DESCRIPTION

Figure 1:
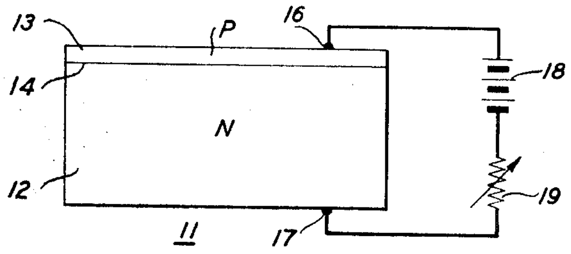
FIG. 1 is a schematic view of a device embodying the principles of the invention.

FIG. 1 is an illustration of a simple p-n junction electroluminescent device embodying the principles of the present invention which emits light in the green region of the spectrum, e.g., a band centered at 5650 A. wavelength, at room temperature within a half-width of the band of about 150 A.

The device 11 of FIG. 1 comprises a crystal 12 of gallium phosphide doped with sulphur to produce an n-type conductivity in the crystal. A p-type conductivity layer 13 of nitrogen-doped, zinc-doped GaP is deposited on crystal 12, preferably by epitaxial growth, creating a p-n junction 14.

Electrical contacts 16 and 17 to the p and n layers, respectively, may be of any suitable material, such as, for example, gold-zinc alloy or tin. A voltage source 18, shown schematically as a battery, is connected in a forward bias position between contacts 16 and 17, and a variable resistor 19 is connected in series therewith to control the amount of bias applied to device 11.

Figure 2:
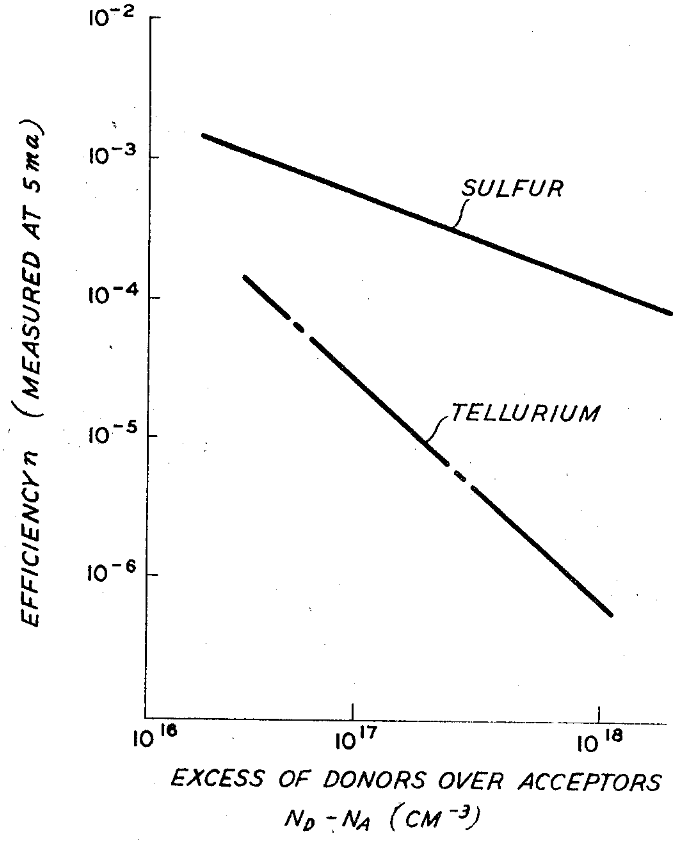
FIG. 2 is a graph depicting variations in efficiency with doping level of certain electroluminescent devices.

In operation, when a sufficient voltage, e.g., 2 or 3 volts, is applied to device 11, it emits green light. In accordance with present theory, it is believed that electrons from the n region 12 are swept across junction 14 into the nitrogen-doped p region where they are trapped at the isoelectronic trap sites along with holes existing in the p region. Holes and electrons thus trapped recombine to produce green light. Only a small portion of the total current created by the applied voltage is used in the radiative recombination process, the remainder being wasted by the nonradiative recombination of electrons and holes at "killer centers" in the junction region. We have found that efforts to increase the injection current by increased donor doping increases "killer centers" at an even greater rate, thereby actually reducing efficiency instead of, as previously thought, increasing efficiency. In FIG. 2 there is shown a graph of electroluminescent efficiency versus donor minus acceptor concentrations. It can be seen that sulphur doping produces considerably higher efficiencies for any donor concentration than does tellurium, and that the efficiency decreases with increased donor concentrations at a much slow rate than for tellurium doping. Although not shown, selenium behaves quite similarly to tellurium. Maximum efficiencies for sulphur doping on the graph of FIG. 2 occur for excess sulphur donor concentrations of approximately $5 \times 10^{16}$ to $2 \times 10^{17}$ per cubic centimeter. With present techniques, it is extremely difficult to achieve sulphur concentrations of less than $5 \times 10^{16}$ per $cm.^3$, although it is reasonable to assume that even higher efficiencies would be obtained. The measurements for the graph of FIG. 2 were made at five milliamps total current. Increased current does not alter the shape of the curves, but merely shifts them upward to reflect the increased overall efficiency.

We have developed a technique for producing diodes of the type shown in FIG. 1 with the optimum sulphur concentrations to produce the maximum efficiency shown in FIG. 2.

The device 11 is made by growing a sulphur-doped GaP crystal as follows. Approximately 50 grams of gallium are inserted in a chemically clean and degassed quartz vessel which is then evacuated to $10^{-6}$ mm. Hg while heating to 1000° C. for one hour. Five grams of GaP and 100 micrograms of $Ga_2S_3$ are then inserted into the vessel which is again evacuated to $10^{-6}$ mm. Hg and sealed off.

After being sealed, the vessel is inserted in a furnace and heated to 1200° C. for six hours, or until equilibrium is achieved. It is then cooled at the rate of 30° C. per hour to room temperature, after which it is opened and the grown crystals of GaP, doped with $10^{17}$ $cm.^{-3}$ sulphur are separated out of the gallium by digesting in $HNO_3$. The sulphur concentration is varied within the aforementioned limits by varying the amount of $GaS_3$ added to the vessel. The crystal also contains residual nitrogen doping and the properties may be enhanced by adding controlled amounts of nitrogen as pointed out in the aforementioned Lynch et al. application. It is also possible to introduce controlled amounts of nitrogen by other methods, such as one to be shown and described in an application to be filed in the name of R. B. Zetterstrom.

A crystal of the GaP is polished to flatness on the 111 faces, etched, cleaned and placed in a tipping boat so that a phosphorus face is exposed. In the other end of the boat is placed 2 gr. of Ga and 0.2 gr. of GaP, and the boat is placed in a room temperature spot in a temperature gradient furnace. A stream consisting of a mixture of $H_2$ and $NH_3$ gas is directed to flow through the furnace and a boat containing zinc is placed upstream of the tipping boat at a 600° region of the furnace. The tipping boat is then moved to a 900° region of the furnace where the zinc reacts with the gallium in the tipping boat. The tipping boat is then raised to approximately 1040° C. while the Ga, the GaP, the zinc, and the $NH_3$ reach an equilibrium condition producing N-doped, zinc-doped GaP dissolved in the gallium solution. The zinc doping is such as to cause an acceptor concentration of approximately $5 \times 10^{17}$ $cm.^{-3}$. The boat is then tipped so that the solution flows onto the sulphur-doped GaP crystal. At this stage the temperature is raised slightly, i.e., 1° or 2° to wet the surface of the crystal. The furnace is then cooled to 900° C. over a period of 15 to 30 minutes, after which the boat is moved to the cold end of the furnace. The boat is then removed from the furnace and the sulphur-doped gallium phosphide crystal containing an epitaxially grown junction is removed. The crystal is then heat treated in air at 625° C. for one-half hour to improve efficiency.

The diode thus formed is then cut to size, polished, and contacts are affixed.

The method described is a reliable way of producing uniformly doped GaP diodes. Inasmuch as the principles of the invention may be applied to other materials forming other types of electroluminescent diodes, certain of the foregoing steps may vary depending upon the specific materials. The method does afford a high degree of control over the sulphur doping to achieve optimum efficiency, regardless of the types of material involved.

It will be readily apparent to workers in the art that the growth of a sulphur-doped layer on a zinc-doped seed will yield the same results as herein described.

The various features of the present invention have been illustrated in a GaP electroluminescent diode which is representative of the III–V class of materials to which the principles of the invention are applicable. It is not intended that these principles be limited to such diodes, it being clear that other application of these principles to other materials may occur to workers in the art without departing from the scope of the invention.

What is claimed is:

1. The process of making an electroluminescent device for use at room temperatures comprising the steps of heating gallium, gallium phosphide, and gallium sulfide, according to predetermined proportions thereof, in an evacuated vessel at a first temperature elevated above room temperature until equilibrium is reached, then cooling to room temperature and separating out at least one n-type gallium phosphide crystal, polishing the 111 faces thereof, and epitaxially growing from the liquid phase a p-type layer on a phosphorus face of the n-type crystal by heating at a second temperature in a gas stream mixture of $H_2$ and $NH_3$ a solution comprising gallium phosphide doped with an acceptor impurity in molten gallium and flowing the solution onto the n-type crystal.

2. The process as claimed in claim 1 wherein the gallium sulfide proportion is chosen to produce an excess donor concentration in the range of $5 \times 10^{16}$ to $2 \times 10^{17}$ $cm.^{-3}$.

3. The process recited in claim 1 in which the gallium, gallium phosphide, and gallium sulfide are heated in the proportions of approximately 50 to 5 to $100 \times 10^{-6}$ in the evacuated vessel.

4. The process recited in claim 1 in which the first temperature is approximately 1200° C., and the cooling is carried out at a rate of approximately 30° C. per hour.

5. The process recited in claim 1 in which the second temperature is approximately 1040° C.

6. The process recited in claim 1 which further comprises the step of heating treating the crystal at approximately 625° C. in air subsequent to flowing the solution onto the n-type crystal.

References Cited

UNITED STATES PATENTS

| | | | |
|---|---|---|---|
| 3,427,211 | 2/1969 | Foster et al. | 148—171 |
| 3,462,320 | 8/1969 | Lynch et al. | 148—171 |
| 3,463,680 | 8/1969 | Melngailis et al. | 148—172 |
| 3,470,038 | 9/1969 | Logan et al. | 148—171 |

L. DEWAYNE RUTLEDGE, Primary Examiner

E. L. WEISE, Assistant Examiner

U.S. Cl. X.R.

317—237